(No Model.) 2 Sheets—Sheet 1.
W. SMITH.
PIPE CONNECTION.

No. 569,247. Patented Oct. 13, 1896.

WITNESSES: INVENTOR:

(No Model.) W. SMITH.
PIPE CONNECTION.
2 Sheets—Sheet 2.
No. 569,247.  Patented Oct. 13, 1896.
FIG. 4.
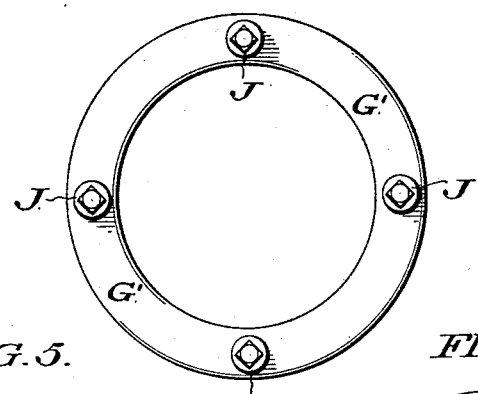
FIG. 5.   FIG. 6.
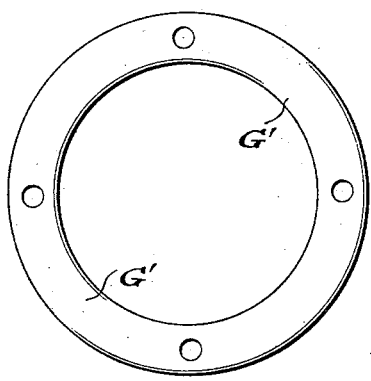 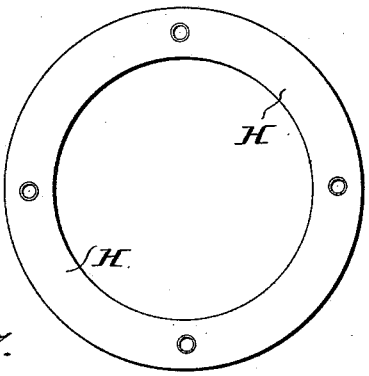
FIG. 7.
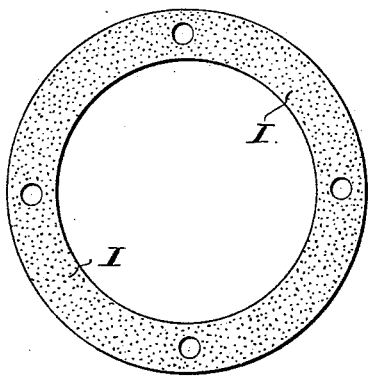
FIG. 3.
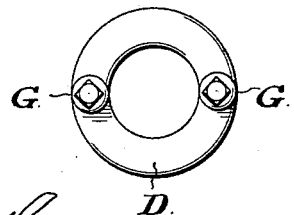
WITNESSES:  INVENTOR:

UNITED STATES PATENT OFFICE.

WILLIAM SMITH, OF TRENTON, NEW JERSEY.

PIPE CONNECTION.

SPECIFICATION forming part of Letters Patent No. 569,247, dated October 13, 1896.

Application filed June 17, 1895. Serial No. 553,036. (No model.)

*To all whom it may concern:*

Be it known that I, WILLIAM SMITH, a citizen of the United States, residing at Trenton, in the county of Mercer and State of New Jersey, have invented certain new and useful Improvements in Pipe Connections, of which the following is a specification.

My invention relates to that class of pipe connections used principally in forming a water-tight joint between articles of sanitary earthenware and the pipes connected therewith; and the object of my invention is to produce a simple, close, and efficient joint possessing sufficient flexibility to prevent fracture of the earthenware by any strain upon the pipes connected therewith and to reduce to a minimum the strain upon the earthenware necessarily produced by the packing of the joint.

Heretofore divers joints have been used between articles of sanitary earthenware and the pipes connected therewith for supplying water thereto or draining it away therefrom and for ventilating purposes, and a number of such joints have been formed with a flexible bearing upon the earthenware by the use of india-rubber packings; but in forming such joints it has been the practice to provide the metallic pipe inserted into the earthenware with a flange or collar, against which a ring or tube made of vulcanized india-rubber is forced by means of a threaded nut which screws upon a thread cut on the outside of the metallic pipe to expand the same against the earthenware. This construction has compelled the use of a pipe made of hard metal, such as iron or brass, which pipe must be united to the ordinary lead pipe which commonly conveys water to the article of earthenware, and considerable expense and labor are always incident to the construction of such joints. By the use of my improved device, hereinafter described, the necessity of either a flange or collar or thread upon the metallic pipe is obviated, and an ordinary lead pipe may be cut off to any required length, and the main pipe which conveys the water to the earthenware structure may be inserted directly into the socket or opening in the earthenware made to receive a metal pipe and a perfectly tight joint may be secured without undue strain either upon the metallic pipe or the earthenware structure.

Figure 2:
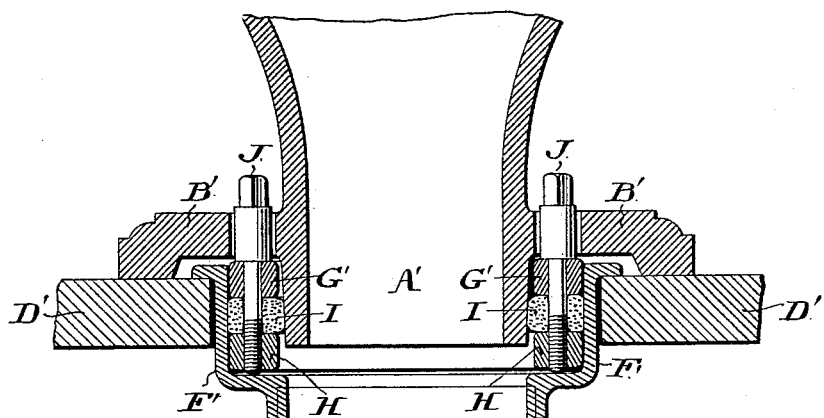
Figure 8:
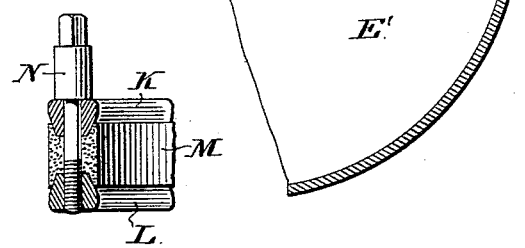
Figure 1:
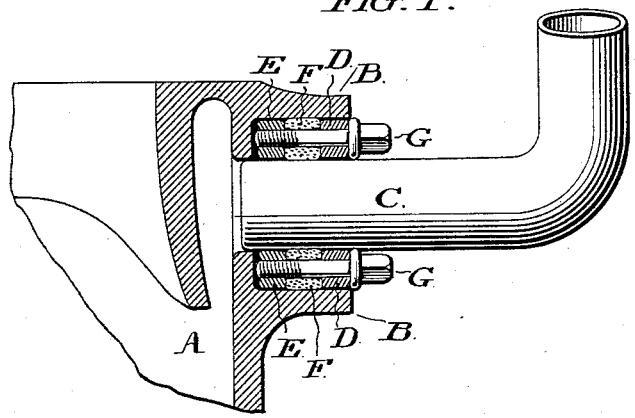

In the drawings forming a part of this specification, Figure 1 shows a vertical sectional view of a portion of a water-closet bowl and an ordinary water-supply pipe joined thereto by one of my improved connections, which said connection is also shown in section. Fig. 2 shows a vertical cross-section of the foot and lower portion of an ordinary hopper and of the metallic trap beneath the same, said parts being joined by one of my improved connections, said connection being shown in vertical cross-section also. Fig. 3 is a top view, on a reduced scale, of my improved connection shown in Fig. 1. Fig. 4 is a top view of my improved connection of the form shown in vertical cross-section in Fig. 2. Fig. 5 is the upper metal ring of the connection shown in Fig. 4. Fig. 6 shows the lower metallic ring of the connection shown in Fig. 4. Fig. 7 is the packing-ring of said connection shown in Fig. 4, and Fig. 8 shows a vertical cross-section of a modified form of my improved connection.

In the drawings, A is a portion of the back wall of a water-closet bowl.

B is the socket projection or horn of the bowl.

C is the water-supply pipe.

D is one of the metal rings forming a part of my connection.

E is another metal ring forming part thereof, and F is an intervening ring of vulcanized india-rubber.

G and G are screw-bolts.

The socket projection B of an earthenware water-closet bowl to which it is desired to attach a supply-pipe by means of one of my connections may be made of any usual form, provided only its internal diameter be sufficient to admit of the intervention of my connection between the pipe to be inserted therein and the inner wall of the socket projection or horn of the closet. The main supply-pipe itself, if desired, may be bent and inserted within the horn or socket projection, as shown in Fig. 1.

My improved connection is formed of two metal rings D and E. The ring D has two annular openings formed through it diametrically opposite to each other to receive the screw-bolts G G. The other metallic ring has two threaded openings formed in it diametrically opposite to each other to receive the threaded ends of the screw-bolts G G. A ring F, made of vulcanized india-rubber, of the same internal and external diameters as said metal rings and having two circular apertures through it placed to register with the said apertures in the metal rings, is placed between the two metal rings and the screw-bolts G G are inserted through the metal ring D and india-rubber ring F and screwed slightly into the metal ring E. The combined metal and rubber rings are then passed onto the end of the metal pipe C and the whole is inserted into the socket projection or horn B in the manner shown in Fig. 1. The screws G G are then turned by a wrench until the two metallic rings D and E are clamped against the india-rubber ring F sufficiently to expand it inwardly and outwardly to bear strongly on its outside against the inner wall of the horn B and on its inner side against the pipe C, when the connection is completed and is perfectly water-tight.

In Fig. 2 I have shown my connection in a slightly-modified form used to join the outlet of an ordinary hopper with the metallic trap placed beneath the same. In this construction A' is the outlet of the hopper. B' is the foot thereof. D' is the floor on which the hopper rests. E' is the trap. F' is a metal flange resting upon the floor D' and attached at its lower side by solder or otherwise to the trap E'. G' is the upper metallic ring of my connection. H is the lower metallic ring thereof. I is the india-rubber ring thereof. J J are two of the screw-bolts used to connect the several rings. In this form of my connection I prefer to use as many as four connecting-bolts, as shown in Fig. 4, the same number of annular openings being formed in the two metallic rings and the india-rubber ring thereof. (See Figs. 5, 6, and 7.) Four openings of sufficient diameter to admit the heads of the bolts J J are formed through the foot D' of the hopper. The trap E' being properly placed, the flange F' is attached thereto in the usual manner. My connection, consisting of the metal rings and india-rubber ring, is then placed within the flange F' with the apertures through each ring registering with the corresponding apertures in the other rings, and the hopper is placed in position with the annular openings in the foot thereof registering with the openings in said rings. The screws J J J J are then inserted through the registering openings of the foot of the hopper and the rings and are screwed down tightly by means of a wrench. By this operation the india-rubber ring I, intervening between the metallic rings G' and H, is thus forced strongly against the flange F' of the trap E' on its inside and against the outlet-pipe A of the hopper upon the outside walls thereof, and a perfectly water and gas tight connection is effected. The foot of the hopper may be rigidly secured to the floor D by other connections, if desired, but the force exerted by the india-rubber ring I to connect the hopper with the flange F' will generally be found sufficient to afford all desirable stability to the hopper.

In Fig. 8 I have illustrated a modified form of my connection. In this figure, K is the outer metallic ring of my connection. L is the inner ring thereof. M is the india-rubber ring, and N is one of the bolts connecting said rings. The general construction of this modified form of connection shown in Fig. 8 is the same as that of the connection illustrated in Fig. 1 or Fig. 2, excepting that the metallic rings are beveled inwardly upon their opposing faces, while the india-rubber ring M is formed with a middle portion of less thickness than its sides, said sides being projected upwardly and downwardly, as shown in Fig. 8. By this construction I procure a greater expansion of the india-rubber ring, both inwardly and outwardly, with a slighter application of power to the bolts N, and secure a broader bearing-surface upon the parts in contact with the sides of the india-rubber ring.

I have illustrated my connection in an annular form, but, as will be readily understood, it may be made of other forms, such as square or polygonal, in order to fit variously-shaped pipes and apertures. I have also specified that the material of which the intermediate portion of my connection is formed shall be vulcanized india-rubber, but any elastic substance possessing the other necessary qualifications may be used with the same effect.

What I claim, therefore, is—

1. In a pipe connection two metal frames independent of the connected parts and an intervening form of elastic material, in combination with means also independent of the connected parts for clamping said metal frames upon said form of elastic material and expanding the same both inwardly and outwardly in the plane of said form of elastic material; substantially as shown and described.

2. In a sanitary connection the combination of two metal frames independent of the connected parts, a form of elastic material between said frames, registering apertures formed through said metal frames and form of elastic material, said apertures in one of said metal frames being threaded, and screw-bolts uniting said metal frames and adapted to clamp said form of elastic material between said metal frames and expand it both inwardly and outwardly in its plane; substantially as shown and described.

3. The combination of the horn of a water-closet bowl, a metallic pipe inserted therein, two metal rings loosely surrounding said metallic pipe within said horn, a ring of elastic material placed intermediate said metal rings, and screw connections between said metal rings adapted to clamp said rings upon said elastic ring and expand it outwardly against the inner side of said horn and inwardly against said metallic pipe; substantially as shown and described.

4. In a pipe connection two metal rings, said rings being beveled on their opposing faces, a ring of elastic material intermediate said two metal rings, said ring of elastic material having internal and external flanges bearing upon the beveled faces of said metal rings in combination with screws adapted to clamp said metal rings upon said ring of elastic material and expand it diametrically inwardly and outwardly; substantially as shown and described.

WILLIAM SMITH.

Witnesses:
F. W. GNICHTEL,
F. C. LOWTHORP.